(12) United States Patent
McKee et al.

(10) Patent No.: US 7,788,588 B2
(45) Date of Patent: Aug. 31, 2010

(54) REALIZING USERS' PREFERENCES

(75) Inventors: Timothy P. McKee, Seattle, WA (US);
Zeke B. Odins-Lucas, Seattle, WA (US); J. Craig Hally, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1173 days.

(21) Appl. No.: 10/361,712

(22) Filed: Feb. 7, 2003

(65) Prior Publication Data
US 2004/0155901 A1    Aug. 12, 2004

(51) Int. Cl.
*G06F 3/00* (2006.01)
(52) U.S. Cl. .................... 715/741; 715/745; 715/866
(58) Field of Classification Search ........... 715/745, 715/866, 741
See application file for complete search history.

(56) References Cited

U.S. PATENT DOCUMENTS 5,349,658 A * 9/1994 O'Rourke et al. .......... 715/839
6,750,881 B1 * 6/2004 Appelman .................. 715/733

OTHER PUBLICATIONS

Karp, David "Windows XP in a Nutshell" Apr. 2002.*

* cited by examiner

*Primary Examiner*—Boris Pesin
(74) *Attorney, Agent, or Firm*—Shook, Hardy & Bacon LLP

(57) ABSTRACT

A method implemented in a computer system realizes a user's preferences for launching applications for corresponding kinds of files. The method launches a first application to service a file unless a second application is available to service the same kind of file. If such is the case, the method presents a consent user interface to allow the user to indicate a preference between the first application and the second application. Changes to the preference are inhibited unless made via the consent user interface.

22 Claims, 14 Drawing Sheets

Fig.3C. 346

- HKEY_CLASSES_ROOT 348
  - .BOO 350
    - (DEFAULT) = PLAYER-1.MEDIAPLAYER.1 352
    - PERCEIVEDTYPE = VIDEO 354
    - OPENWITHPROGIDS 356
      - PLAYER-1.MEDIAPLAYER.1 358
      - PLAYER-2.MEDIAPLAYER.1 360
    - OPENWITHLIST 362
      - PLAYER-1MEDIAPLAYER.EXE 364
      - PLAYER-2MEDIAPLAYER.EXE 366
    - LASTKNOWN = PLAYER-1.MEDIAPLAYER.1 368
    - NOTCHOSEN = 370
  - PLAYER-1.MEDIAPLAYER.1 372
    - SHELL/PLAY/COMMAND = "%PROGRAM FILES%\VENDOR-1\PLAYER-1MEDIAPLAYER.EXE" "%1" 374
  - PLAYER-2.MEDIAPLAYER.1 375
    - SHELL/PLAY/COMMAND = "%PROGRAM FILES%\VENDOR-2\PLAYER-2MEDIAPLAYER.EXE" "%1" 376
  - SYSTEMFILEASSOCIATIONS 394
    - VIDEO 396
      - SHELL/PLAY/COMMAND 398
        - (DEFAULT) = "%PROGRAM FILES%\VENDOR-1\PLAYER-1MEDIAPLAYER.EXE" "%1" 399
      - LASTKNOWN = PLAYER-1.MEDIAPLAYER.1 397
      - NOTCHOSEN = 395

REALIZING USERS' PREFERENCES

FIELD OF THE INVENTION

The present invention relates generally to recognizing users' preferences in regard to defaults, and more particularly, to the application of users' preferences whenever there is a contention for default actions.

BACKGROUND OF THE INVENTION

First appearing as massive machines seen only in the basements of research universities, the computer eventually found its way into homes and offices in the smaller, more accessible form of a personal computer. The introduction of simpler, "user-friendly" methods for controlling the operations of computers was accomplished by substituting a graphical user interface for the typewriter-like interface. Graphical user interface allows the user to select icons (graphic symbols of computer functions) from a display screen instead of requiring typed commands. As computers and software applications have become easier to use, or more "user-friendly," many people are finding them both useful for entertainment and necessary for their jobs. With the proliferation of applications that provide similar services, software manufacturers have turned the personal computer into a highly competitive zone to get users to use their software.

The perception of user-friendliness at the surface of the graphical user interface belies complex choices and intricate instructions that allow a personal computer to operate. In making computers and related equipment, original equipment manufacturers typically purchase or license software applications from software manufacturers and hardware components from hardware manufacturers; integrate them into products of the original equipment manufacturers; and sell these products to the public. Initially, choices are made for users by the software manufacturers to allow these users to easily operate software upon installation without tedious customization and intimate familiarity. To satisfy users in various markets, the original equipment manufacturers change the choices made by software manufacturers, which cause varied configurations from personal computer to personal computer. These choices are known as defaults, which are selections automatically used by software applications in the absence of a choice made by a user. Inexperienced users can rely on choices made by software manufacturers and original equipment manufacturers at first, but overtime, as users progress in their experience and grow confident in using the personal computer, these users may begin to form their own preferences and desire to change the previously set choices and defaults.

The software marketplace has become intensely competitive. Various software manufacturers have fought vigorously to maintain their wares as the applications of choice, (the defaults), in disregard to user preferences. A system 100 in FIG. 1 illustrates this problem in greater detail. The system 100 includes two competing applications 102, 112, which are players for playing music and other audio files that either have been ripped (transferred from a compact disk to a hard disk) or distributed over the Internet via a suitable digital audio coding scheme, such as MP3.

Players 102, 112, like other window applications, include title bars 104, 114, which are horizontal spaces at the top of windows that contain the name of the application, such as "Music Player 1" or "Music Player 2." Appearing as square buttons in the right corners of title bars 104, 114 with an X marked on them are Close buttons 106, 116. Clicking on Close buttons 106, 116 cancels players 102, 112. A number of buttons in iconic form 108A-108C, 118A-118C, allow a user to access streaming digital music elsewhere on the Internet. For example, buttons 108A, 118A allow the user to access encoded classical music, which includes music in the educated European tradition in forms such as art song, chamber music, opera, and symphony as well as music of the late 18th and early 19th centuries characterized by an emphasis on balance, clarity, and moderation. Jazz music that is characterized by propulsive, syncopated rhythms, polyphonic ensemble playing, varied degrees of improvisation, and deliberate distortion of pitch and timbre can be accessed by actuating buttons 108B, 118B. Rock music, which is popular music played on electronically amplified instruments and characterized by persistent heavily accented beats, much repetition of simple phrases, and often containing country, folk, and blues elements, is accessed by clicking on buttons 108C, 118C.

Players 102, 112 include sets of VCR-style mechanisms 110, 120, which are user interfaces for playing music files. Mechanisms 110, 120 have controls similar to those on a video cassette recorder, including a rewind control, a play control, a fast-forward control, and a stop control. A music file 122 is a collection of audio information that a user can send to players 102, 112 to reproduce the original music recording. When the user double-clicks on the music file 122, the user expects either the player 102 or the player 112—but not both—to open the music file 122 and proceed to play the music stored therein.

The system 100 includes a database 124 into which player 102 can set itself during the installation process as the default in launching application 102 when the music file 122 is double-clicked by the user. The database 124 includes any suitable databases, such as the registry of Microsoft Windows®. Because the player 112 can also service the same type of music file 122, during the installation of the player 112, which is subsequent to the installation of the player 102, the installation process of the player 112 accesses the database 124, removes the player 102 as the default, and asserts itself (the player 112) as the default. This practice of supplanting another application to make one's own application the default has grown worse with the proliferation of applications that provide similar services—irrespective of users' preferences.

To prevent the player 112 from usurping the player 102 as the default, the software manufacturer of the player 102 can engineer a service 126 running in the background of the system 100 to monitor the database 124. When the service 126 determines that the player 112 or other applications have displaced the player 102 as the default, the service 126 modifies portions of the database 124 so that the player 102 is once again the application of choice. However, the software manufacturer of the player 112 also can launch its own service 128 to monitor the database 124. When the service 128 detects that the player 102 among other applications has replaced the player 112 as the default, the service 128, like the service 126, changes portions of the database 124 to reflect that the player 112 is again the application of choice to play the music file 122.

This tug-of-war between players 102, 112 is carried out in complete disregard for the preferences of the user. Moreover, as players 102, 112 and services 126, 128 contest, the system 100 becomes unstable. The user is not assured which player, 102 or 1-12, will be launched when the user double-clicks on the music file 122. The data in the database 124 continues to be in a transient state because of the constant modifications by services 126, 128. Without a solution to quiet the dispute between applications and respect the preferences of users, eventually users may no longer trust the system 100 to provide a desired computing experience and the demands for the system 100 as well as players 102, 112 will diminish from the marketplace. Thus, there is a need for a method and a system for realizing users' preferences regarding applications to be launched to process corresponding kinds of files, while avoiding or reducing the foregoing and other problems associated with existing applications.

SUMMARY OF THE INVENTION

In accordance with this invention, a system, method, and computer-readable medium for realizing preferences of users in connection with launching applications for corresponding kinds of files is provided. The system form of the invention comprises a computer system for launching applications preferred by users. The computer system includes a consent user interface for capturing an identity of an application. The application is chosen by a user as a preferred application to be launched to process files of the same kind. The computer system further includes a portion of a database for storing the identity of the preferred application to be launched. The portion of the database inhibits changes to the identity of the preferred application that is chosen by the user unless the changes are made via the consent user interface.

In accordance with further aspects of this invention, another system form of the invention comprises a display device having rendered thereon a consent user interface for capturing a user's preferred applications. The display device includes a window occupying a portion of a screen of the display device. The window includes a first icon for representing a default application. The default application is a previously preferred application for the consideration of the user to select as a newly preferred application to be launched to process a file. The window further includes a second icon for representing a new application for the consideration of the user to select as the newly preferred application to be launched to process the same kind of file.

In accordance with further aspects of this invention, a method form of the invention for capturing a user's preferences is implementable in a computer system. The method includes presenting a consent window to show applications that process the same kind of file.

The method further includes an act for receiving an indication from a user that one of the applications is selected. The method yet further includes an act for storing the identity of a selected application in a portion of a database and the identity of a rejected application in another portion of the database. The database inhibits changes to the identity of the selected application unless the changes are made via the consent window.

In accordance with further aspects of this invention, a computer-readable medium having computer-executable instructions for performing a method for capturing a user's preferences is provided. The method includes presenting a consent window to show applications that process the same kind of file. The method further includes an act for receiving an indication from a user that one of the applications is selected. The method yet further includes an act for storing the identity of a selected application in a portion of a database and the identity of a rejected application in another portion of the database. The database inhibits changes to the identity of the selected application unless the changes are made via the consent window. In accordance with further aspects of this invention, another computer-readable medium having a data structure stored thereon for use by a computing system to realize application preferences of a user is provided. The data structure includes a lastknown key that is indicative of a preferred application chosen by the user via the consent user interface.

The lastknown key is protected by an access control list that inhibits changes unless permitted by the access control list. The data structure includes a notchosen key that indicates the identities of rejected applications. A rejected application inhibits the presentation of the consent user interface if the rejected application is a choice to be shown by the consent user interface.

In accordance with further aspects of this invention, another method form of the invention for realizing a user's preferences for launching applications for corresponding kinds of files is provided. The method includes launching a first application to service a file unless a second application is available to service the same kind of file. The method further includes presenting a consent user interface to allow the user to indicate a preference between the first application and the second application. Changes to the preference are inhibited unless made via the consent user interface.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 3C is a structured diagram illustrating portions of a central hierarchical database, and more particularly, a data structure where the preferences of users are stored, according to one embodiment of the present invention.

FIG. 3D is a structured diagram illustrating the relationship among multiple kinds of files, according to one embodiment of the present invention.

DETAILED DESCRIPTION OF THE PREFERRED EMBODIMENT

Figure 1:
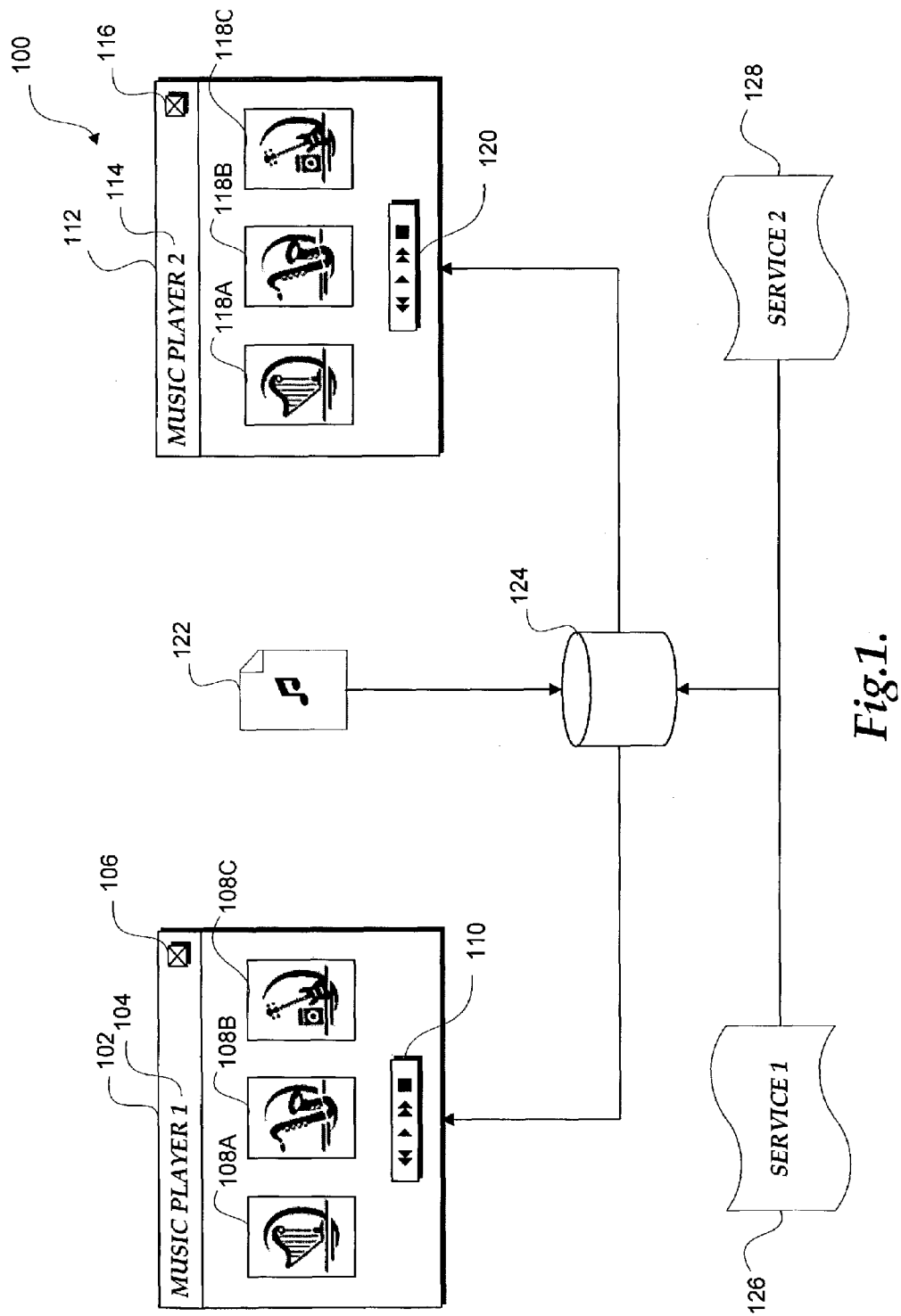
FIG. 1 is a block diagram illustrating a conventional system showing the contention between two software applications vying to be the application of choice.
Figure 2:
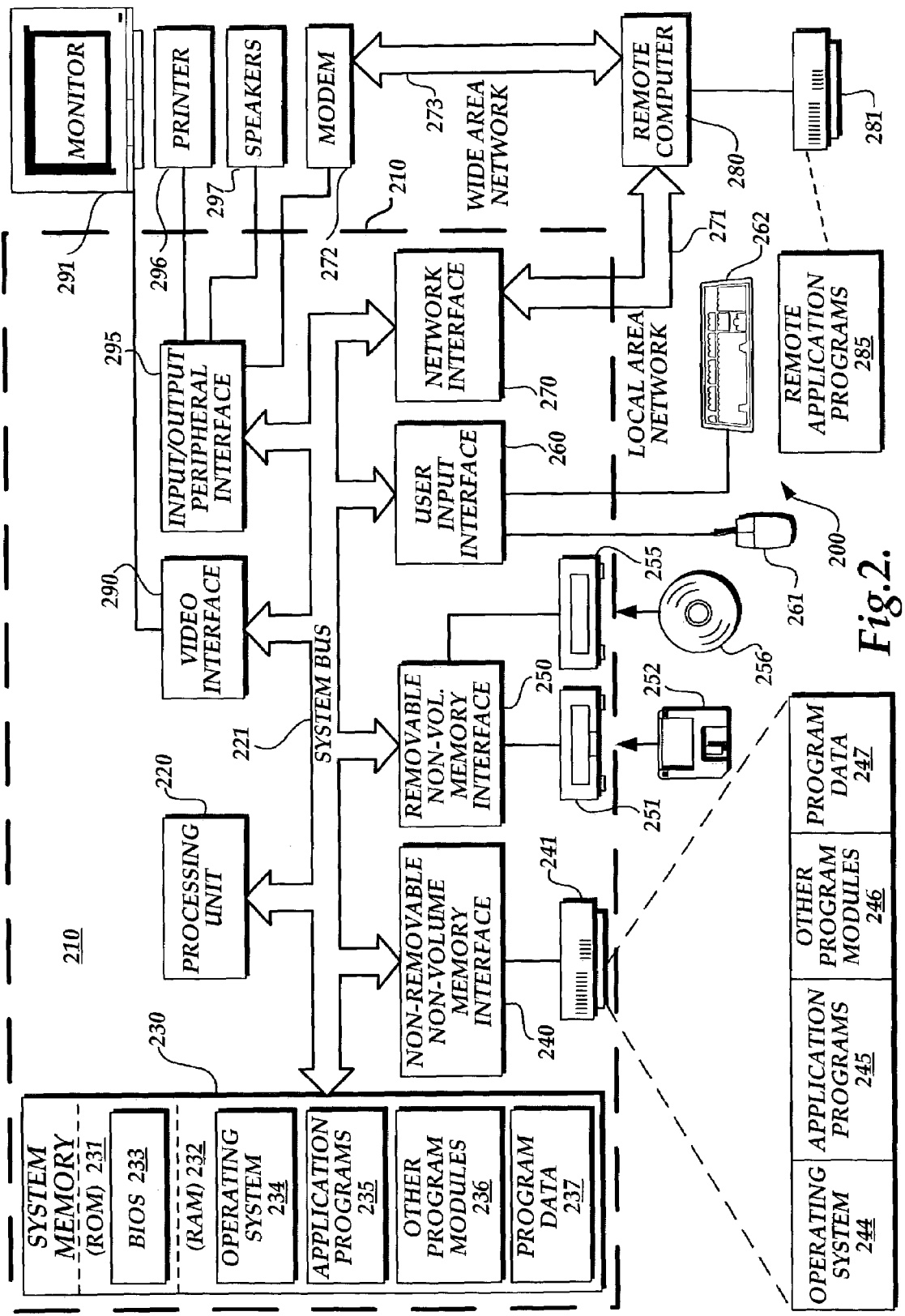
FIG. 2 is a block diagram illustrating an exemplary computing device.

FIG. 2 illustrates an example of a computing system environment 200 suitable for practicing certain aspects of the invention, such as facilitating the capturing of a user's preferences among applications that provide similar computing services and realizing the preferences of users so as to launch applications. The computing system environment 200 is only one example of a suitable computing environment and is not intended to suggest any limitation as to the scope of use or functionality of the invention. Neither should the computing environment 200 be interpreted as having any dependency or requirement relating to any one or combination of the illustrated and described components.

The invention is operational with numerous other general purpose or special purpose computing system environments or configurations. Examples of well-known computing systems, environments and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention is described in the general context of computer-executable instructions, such as program modules being executed by a computer. Generally, program modules include routines, programs, objects, components, data structures, etc. that perform particular tasks or implement particular abstract data types.

The invention may also be practiced in distributed computing environments where tasks are performed by remote processing devices that are linked through a communications network. In a distributed computing environment, program modules may be located in both local and remote computer storage media, including memory storage devices.

The computing system environment illustrated in FIG. 2 includes a general purpose computing device in the form of a computer 210. Components of computer 210 may include, but are not limited to, a processing unit 220, a system memory 230, and a system bus 221 that couples various system components including the system memory to the processing unit 220. The system bus 221 may be any of several types of bus structures, including a memory bus or memory controller, a peripheral bus, and a local bus using any of a variety of bus architectures. By way of example, and not limitation, such bus architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

Computer 210 typically includes a variety of computer-readable media. Computer-readable media can be any available media that can be accessed by computer 210 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information, such as computer-readable instructions, data structures, program modules, or other data. Computer storage media include, but are not limited to, RAM, ROM, EEPROM, flash memory or other memory technology, CD-ROM, digital versatile disks (DVD) or other optical disk storage, magnetic cassettes, magnetic tapes, magnetic disk storage or other magnetic storage devices, or any other computer storage media. Communication media typically embody computer-readable instructions, data structures, program modules or other data in a modulated data signal, such as a carrier wave or other transport mechanism that includes any information delivery media. The term "modulated data signal" means a signal that has one or more of its characteristics set or changed in such a manner as to encode information in the signal. By way of example, and not limitation, communication media include wired media, such as a wired network or direct-wired connection, and wireless media, such as acoustic, RF infrared, and other wireless media. A combination of any of the above should also be included within the scope of computer-readable media.

The system memory 230 includes computer storage media in the form of volatile and/or nonvolatile memory, such as read only memory (ROM) 231 and random access memory (RAM) 232. A basic input/output system 233 (BIOS), containing the basic routines that help to transfer information between elements within computer 210, such as during start-up, is typically stored in ROM 231. RAM 232 typically contains data and/or program modules that are immediately accessible and/or presently being operated on by processing unit 220. By way of example, and not limitation, FIG. 2 illustrates operating system 234, application programs 235, other program modules 236, and program data 237.

The computer 210 may also include other removable/non-removable, volatile/nonvolatile computer storage media. By way of example only, FIG. 2 illustrates the hard disk drive 241 that reads from or writes to non-removable, nonvolatile magnetic media, the magnetic disk drive 251 that reads from or writes to a removable, nonvolatile magnetic disk 252, and an optical disk drive 255 that reads from or writes to a removable, nonvolatile optical disk 256, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital videotapes, solid state RAM, solid state ROM, and the like. The hard disk drive 241 is typically connected to the system bus 221 through a non-removable memory interface, such as interface 240, and the magnetic disk drive 251 and optical disk drive 255 are typically connected to the system bus 221 by a removable memory interface, such as interface 250.

The drives and their associated computer storage media discussed above and illustrated in FIG. 2 provide storage of computer-readable instructions, data structures, program modules and other data for the computer 210. In FIG. 2, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer 210 through input devices, such as a keyboard 262 and pointing device 261, the latter of which is commonly referred to as a mouse, trackball, or touch pad. Other input devices (not shown) may include a microphone, joystick, game pad, satellite dish, scanner, or the like. These and other input devices are often connected to the processing unit 220 through a user input interface 260 that is coupled to the system bus, but may be connected by other interface and bus structures, such as a parallel port, game port, or universal serial bus (USB). A monitor 291 or other type of display device is also connected to the system bus 221 via an interface, such as a video interface 290. In addition to the monitor, computers may also include other peripheral output devices, such as speakers 297 and printer 296, which may be connected through an input/output peripheral interface 295.

The computer 210 may operate in a networked environment using logical connections to one or more remote computers, such as a remote computer 280. The remote computer 280 may be a personal computer, a server, a router, a network PC, a peer device, or other common network node, and typically includes many or all of the elements described above relative to the computer 210, although only a memory storage device 281 has been illustrated in FIG. 2. The logical connections depicted in FIG. 2 include a local area network (LAN) 271 and a wide area network (WAN) 273, but may also include other networks. Such network environments are commonplace in offices, enterprise-wide computer networks, intranets, and the Internet.

When used in a LAN networking environment, the computer 210 is Connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the input/output peripheral interface 295, or other appropriate mechanism. In a networked environment, program modules depicted relative to the computer 210, or portions thereof, may be stored in the remote memory storage device. By way of example, and not limitation, FIG. 2 illustrates remote application programs 285 as residing on memory device 281. It will be appreciated that the network connections shown are for illustrative purposes only and other means of establishing a communication link between the computers may be used.

To protect users' preferences from being changed by the capricious, erratic, unpredictable actions of applications vying to dominate and assert themselves as the application of choice to be launched in connection with certain file types, various embodiments of the present invention elevate the priority of choices made by users above choices made by others, such as original equipment manufacturers or software manufacturers. When a user initially uses an operating system, defaults are already set so as to allow the user to easily use the operating system without having to labor through multitudes of choices. One type of default includes the association of an application to a corresponding file type. Preset defaults help the operating system function for the user in a rich and robust manner. Defaults can vary from personal computer to personal computer because original equipment manufacturers, as well as application manufacturers, install applications and select defaults differently for different users. As users gain confidence over time in using the operating system, many users form specific preferences and begin to make choices, such as the association between a default launching application (or default or default application) and a corresponding file type.

When a user has made a choice, various embodiments of the present invention jettison choices made by others and replace the choice made by the user as the default. For example, when a user manually installs an application for his use, that is a potential user's choice. If an application installed by the user is in contention with an existing application that was not installed by the user, various embodiments of the present invention recognize that the application newly installed by the user is the application of choice, hence the default.

Figure 3A:
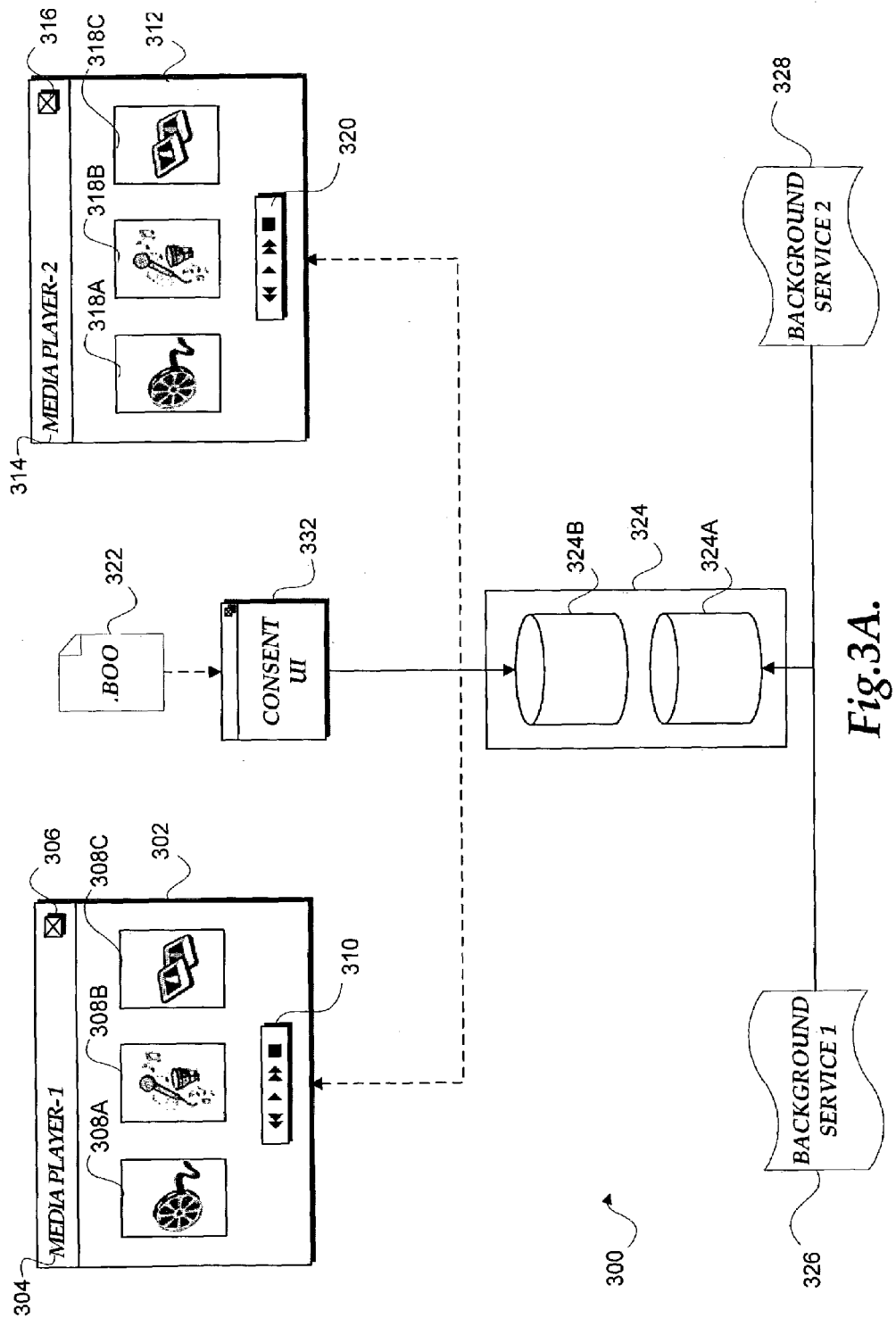
FIG. 3A is a block diagram illustrating pieces of a system for capturing a user's preferences, and more particularly, the inhibition of the instability caused by the contention of applications so as to allow choices made by a user to dominate, according to one embodiment of the present invention.

The newly installed application by the user is given priority because various embodiments of the present invention realize that it is the first decision the user has made (whereas all previous choices were, made on behalf of the user, such as those made by original equipment manufacturers and application manufacturers). When the same user installs a second application that provides services similar to those of the first installed application, an ambiguity in the preferences of the user arises. In this case, various embodiments of the present invention present a consent user interface to capture the user's choice between the two applications. A system 300 in which this consent user interface is presented to the user is illustrated in FIG. 3A.

The system 300 is a computing environment that has pieces of hardware, software applications, and an operating system 330 running on it. A file 322 is a complete, named collection of information, such as a program, a set of data used by a program, or a user-created document. The file 322 is the basic unit of storage that enables the computing environment 300 to distinguish one set of information from another. The file 322 is the glue that binds a conglomeration of instructions, numbers, words, images, music, video, and other data into a coherent unit that a user can retrieve, change, delete, save, open, play, or send to an output device. The data stored in the file 322 includes a combination of sound, graphics, animation, video, and text, which are collectively defined as multimedia information.

The file 322 has a file extension ".boo." A file extension is a set of characters added to a file name that serves to extend or clarify its meaning or to identify it as a member of a category, a type, or a class (which collectively can be referred to as "a kind"). An extension may be assigned by the user or by an application, as, for example, .mpeg, which is a file extension that identifies video and sound files compressed in the MPEG format as specified by the Moving Pictures Experts Group. Designed to assist in the performance of a specific task, an application 302 is a client/control that receives a stream from a server or local source, such as multimedia data from the file 322, for reproducing the contents of the multimedia including sound, graphics, animation, video, and text.

The application 302, like other window applications, include a title bar 304, which is a horizontal space at the top of a window that contains the name of the application, which in this instance is "media player-1." Appearing as a square button in the right corner of the title bar 304 with an X marked on it is a Close button 306. Clicking on the Close button 306 cancels the application 304. Buttons in iconic form 308A-308C allow a user to access streaming multimedia located elsewhere on the network to which the system 300 is coupled or locally via files, such as the file 322. For example, the button 308A allows the user to access video content, which includes recordings of motion pictures or television programs. Music including vocal, instrumental, or mechanical sounds, or combinations thereof, can be accessed by actuating the button 308B. Clicking on the button 308C allows the user to access static images, which are stored descriptions of graphic pictures, either as a set of brightness and color values of pixels or as a set of instructions for reproducing the pictures. The application 302 includes a set of VCR-styled mechanisms 310, which are user interface controls for playing media files. The mechanisms 310 present controls similar to those on a video cassette recorder, such as a rewind control, a play control, a fast-forward control, and a stop control.

When the user double-clicks on the file 322, the user typically expects an application to be launched, such as the application 302, that can service or process the contents of the file 322. The association between the file 322 and the application 302, which is presently the default, can be stored in the portion 324A of a central hierarchical database 324. The central hierarchical database 324 is used to store information necessary to configure the system for one or more users, applications, and hardware devices. The central hierarchical database 324 contains information that an operating system continually references during operation, such as profiles for each user; the applications installed on the computer and types of documents each can create; property sheet settings for folders and application icons; what hardware exists on the system 300; and which ports are being used. The central hierarchical database 324, in addition, can be used, as mentioned above, to store the file association between an application, such as the application 302, and one or more corresponding file types (e.g., in which the file 322 belongs).

The application 302 has a service 326 running in the background of the computing environment 300. This background service 326 constantly monitors the portion 324A and ensures that the association between the player 302 and the file type in which the file 322 is connected is maintained. These activities of the background service 326 make certain that whenever the user double-clicks on the file 322, the application 302 will be invoked to service the file 322.

The system 300 also includes an application 312, which provides services similar, if not identical, to the services provided by the application 302. The application 312 can play the multimedia contents of the file 322. Like the application 302, the application 312 includes a title bar, which is a horizontal space at the top of a window that contains the name of the application, such as "media player-2." Appearing as a square button in the right corner of the title bar 314 with an X marked on it is a Close button 316. Clicking on the Close button 316 cancels the application 312. Numerous icons 318A-318C allow the user to access streaming media information elsewhere on a network to which the system 300 is coupled or locally via files, such as the file 322. Similar to buttons 308A-308C of the application 302, movies, video clips, music recordings, and graphic images can be accessed by clicking on icons 318A-318C. A set of VCR-styled mechanisms 320 is available on the application 312 for the user to control the playback of multimedia information. The mechanism 320 has controls similar to those on a video cassette recorder and includes a rewind control, a play control, a fast-forward control, and a stop control.

To allow the application 312 to be invoked when the user double-clicks on the file 322, the application manufacturer for the application 312 creates an association between the application 312 and the file 322. This association is stored in the portion 324A of the central hierarchical database 324. The application 312, to secure its position as the application of choice when the file 322 is open, launches a background service 328 to monitor the portion 324A. If the portion 324A no longer reflects that the application 312 is the default, the background service 328 modifies the portion 324A so that the application 312 is once again the application of choice. Both background services 326, 328 are agents for applications 302, 312, respectively. The portion 324A is potentially unstable in the system 300 yet the portion 324A stores pieces of information that determine which one of the applications 302, 312 is the default to service the file 322.

Both applications 302, 312 contest to be the default to service the file 322. However, over time the user forms his own choice in the preference between applications 302, 312. This preference is captured by a consent user interface 332 (discussed in greater detail below) and the preference is stored in another portion 324B of the central hierarchical database 324. Storing the user's preferences in portion 324B instead of 324A inhibits system instability associated with the striving of background services 326, 328 to dominate the selection of the default.

Files that contain a particular type of data, such as audio, graphic images, video, or even text, commonly have the same file extension. Each file extension is typically appended to the file name and consists of a period followed by three alphanumeric characters. For example, the file 322 has a file extension ".boo." Although it is a common practice, file extensions need not be restricted to three letters. On computing systems that support long file names, any number of characters can be used to identify file extensions. Files with the identical file extension are members of the same file type. The central hierarchical database 324 allows a file type to be defined so that the behavior of all files in the same type can be specified. One exemplary implementation of the central hierarchical database 324 is the Registry of Microsoft Windows®, but any suitable implementations of the central hierarchical database 324 can be used.

The behaviors of all files of the same type can be customized by adding registry entries into the central hierarchical database 324 by specifying an application to be used to open or play the file when the file is double-clicked. Digressing, to define a file type, a registry key for the file extension, including the period, such as ".boo" is created in a data structure 346, which comprises the portions 324A, 324B, of the central hierarchical database 324. See key 350 of FIG. 3C under a HKEY_CLASSES_ROOT key 348. The key 350 that contains the file extension ".boo" is set to a programmatic identifier "player-1.mediaplayer.1" for associating with the application 302. See key 352. Programmatic identifiers will be explained in greater detail below. Next, under the key 348 another key 372 to represent the programmatic identifier "player-1.mediaplayer.1" is created.

The key 372 contains the programmatic identifier "player-1.mediaplayer.1," whose association with the application 302 is defined by the key 374. The key 374 contains a verb phrase "shell/play/command," where the term "shell" denotes a piece of software, usually a separate program, that provides direct communication between the user and the operating system; the term "play" denotes a verb that is typically invoked on media file types (e.g., the file 322 with the .boo file extension), which indicates that the associated application immediately begins to play the contents of the file rather than just opening the file and waiting for user's directions; and the term "command" denotes the shell command to follow. The key 374 additionally includes two strings that are equated to the verb phrase "shell play/command." The first string is "%programfiles% \vendor-1\player-1mediaplayer.exe," which denotes a directory path to the executable of the application 302. The second string is "%1," which denotes the first argument in the invocation of the application 302 when the verb phrase "shall/play/command" is executed. When the file extension ".boo" (the key 350) and the programmatic identifier "player-1.mediaplayer.1" (the key 372) are defined in the central hierarchical database 324, the user can act on a file of the file type ".boo" in a variety of ways, such as double-clicking the file. To summarize, the key 352 associates the file extension or file type ".boo" defined at the key 350 with the application 302 via keys 372, 374. These keys are stored in the portion 324A of the central hierarchical database 324. These keys are vulnerable to continued changes between application 302 and application 312. Keys 368, 370, 397, and 395 are preferably placed in the portion 324B to guard against contentious changes made by applications 302, 312. These keys 368, 370, 397, and 395 are preferably protected using an accessing control list, which is a list associated with a file that contains information about which users or groups or applications have permission to access or modify the file. The information contained in keys 368, 370, 395, 397 includes preferred applications as well as applications rejected by the user, which is captured by the consent user interface 332. These keys are self-documenting preferably by the use of a language that is human-readable.

Figure 3B:
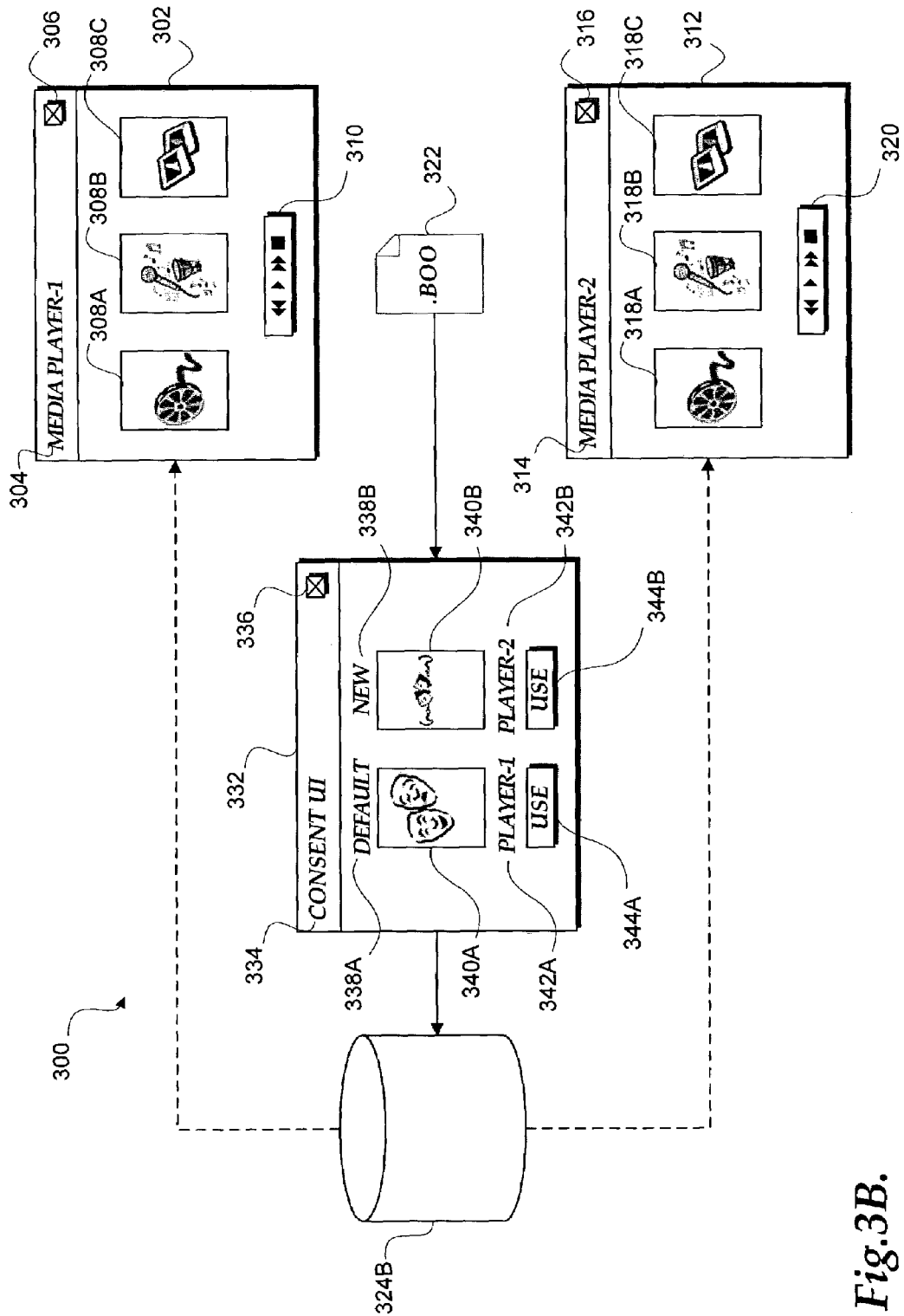
FIG. 3B is a block diagram illustrating pieces of a system for capturing a user's preferences, and more particularly, a consent user interface that allows a user to choose a default between two applications, according to one embodiment of the present invention.
Figure 4A:
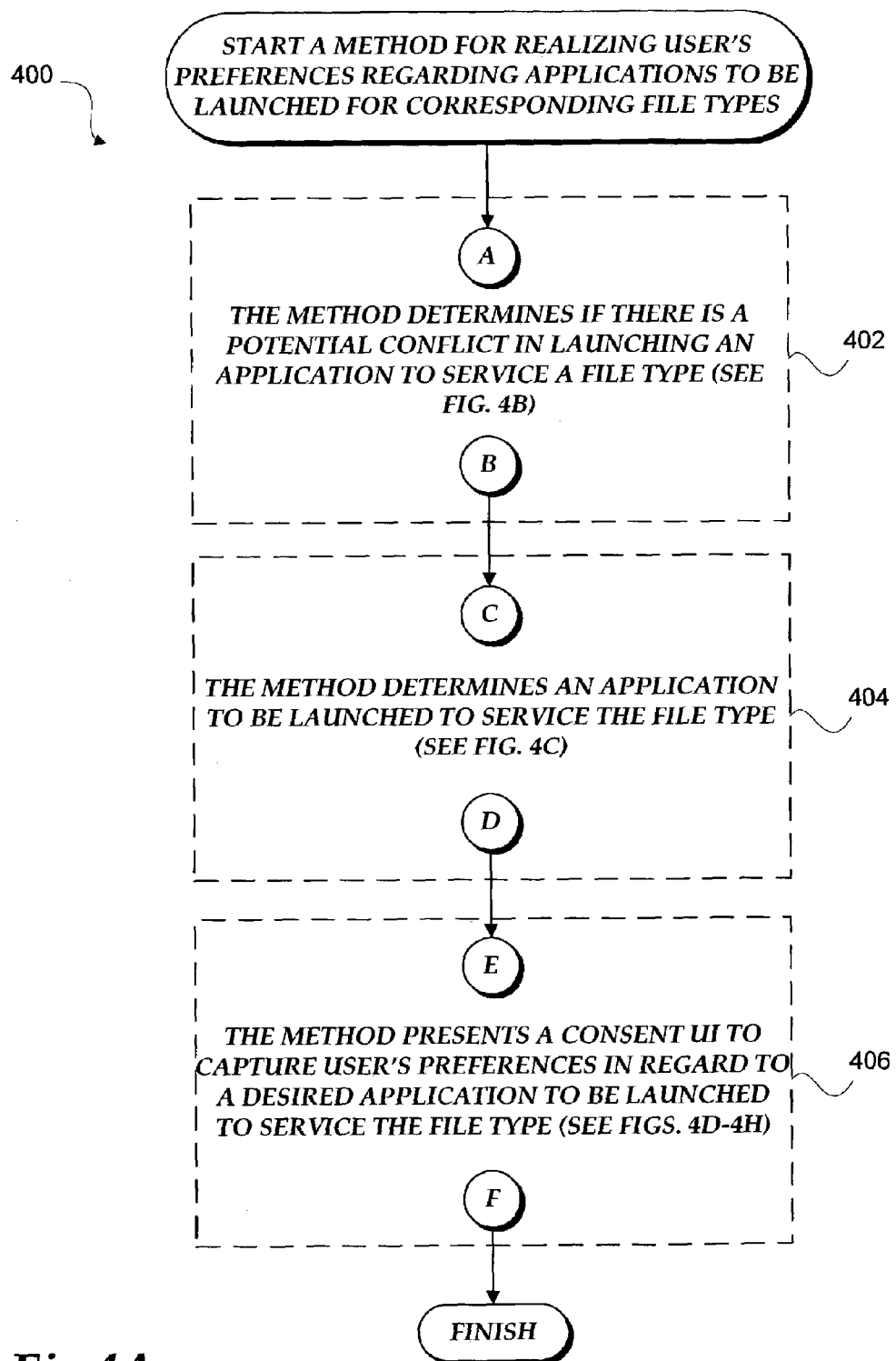
FIGS. 4A-4H are process diagrams illustrating a method for realizing a user's preferences regarding applications to be launched for corresponding kinds of files, according to one embodiment of the present invention.
Figure 4B:
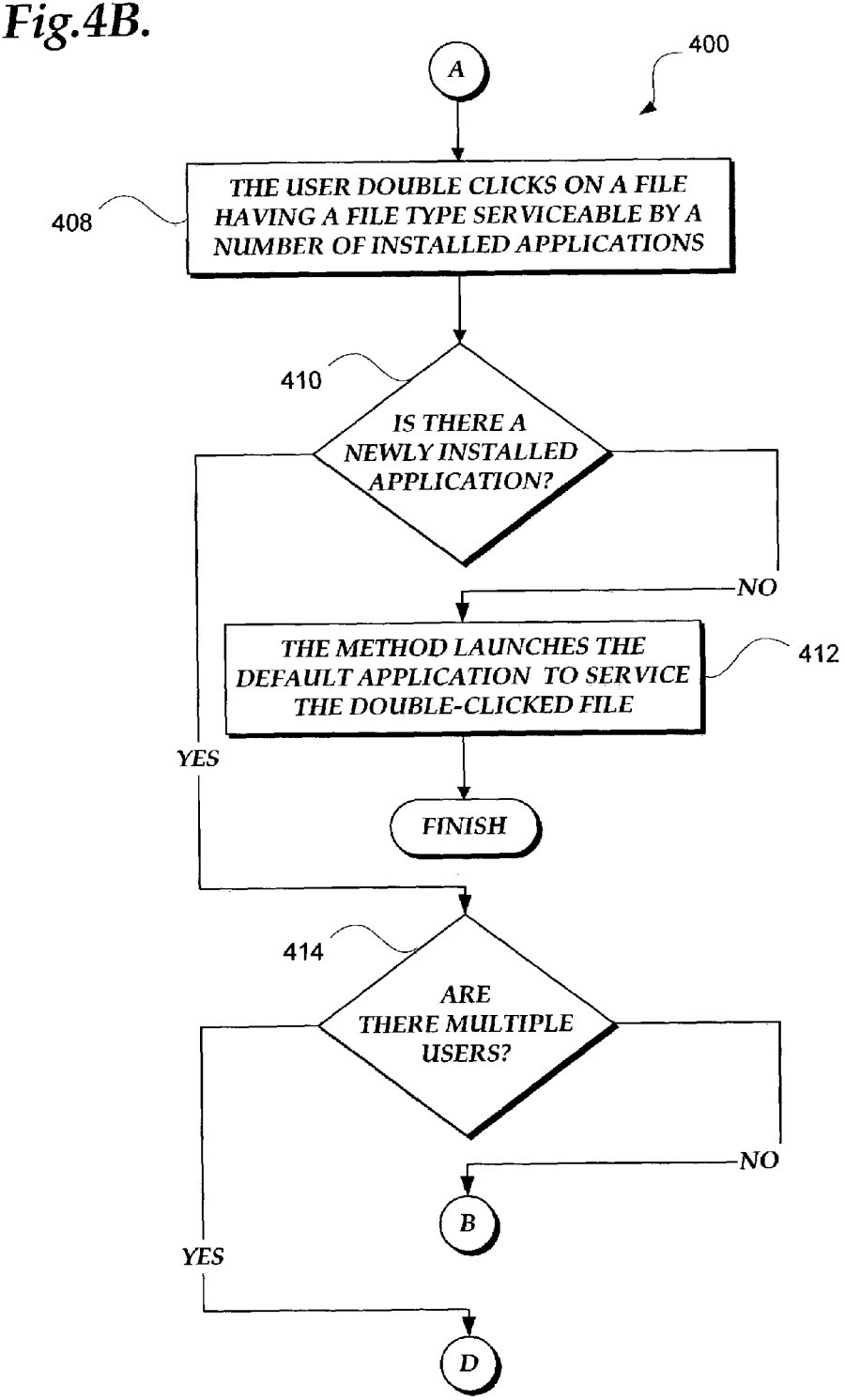
Figure 4C:
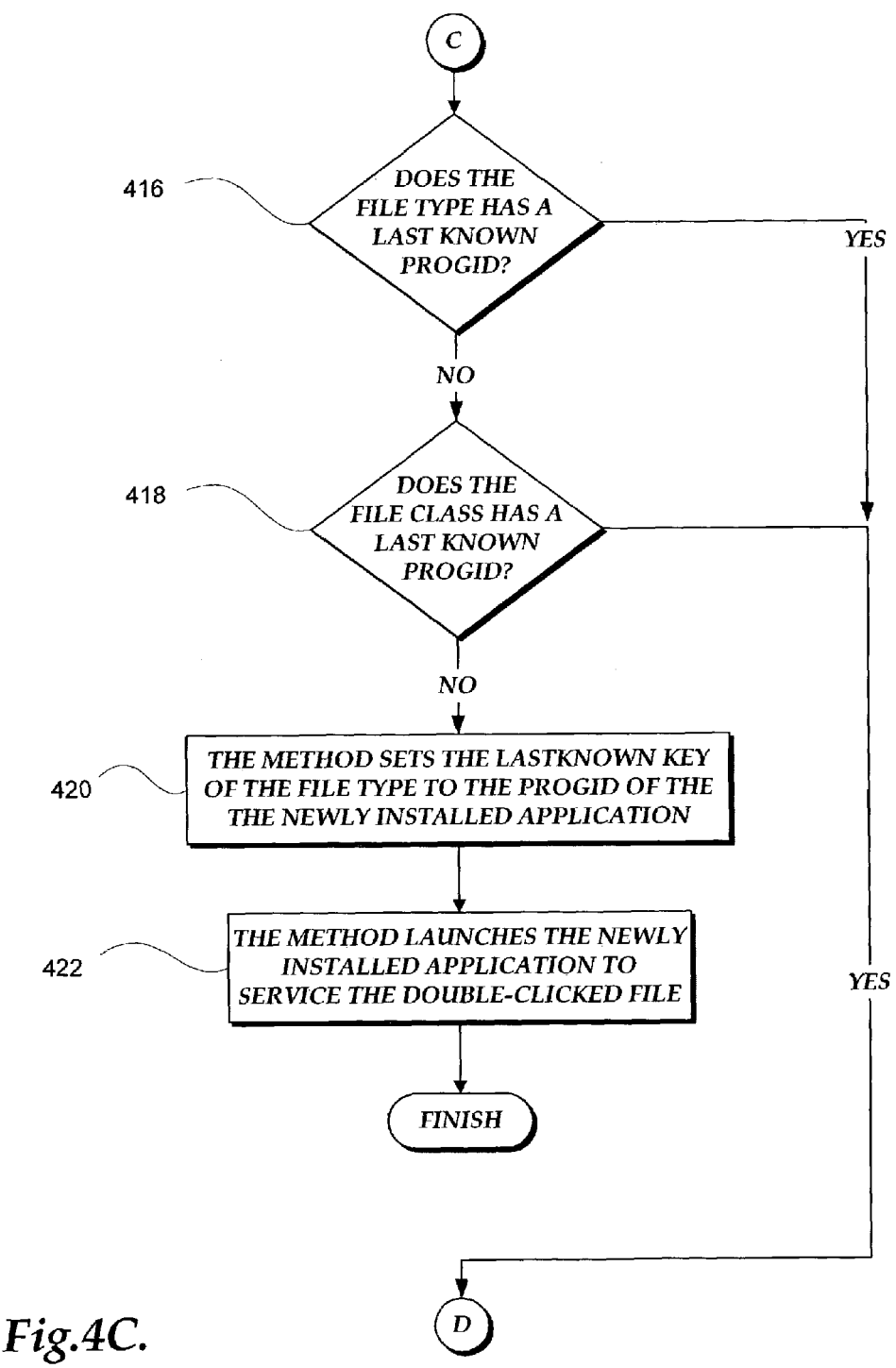
Figure 4D:
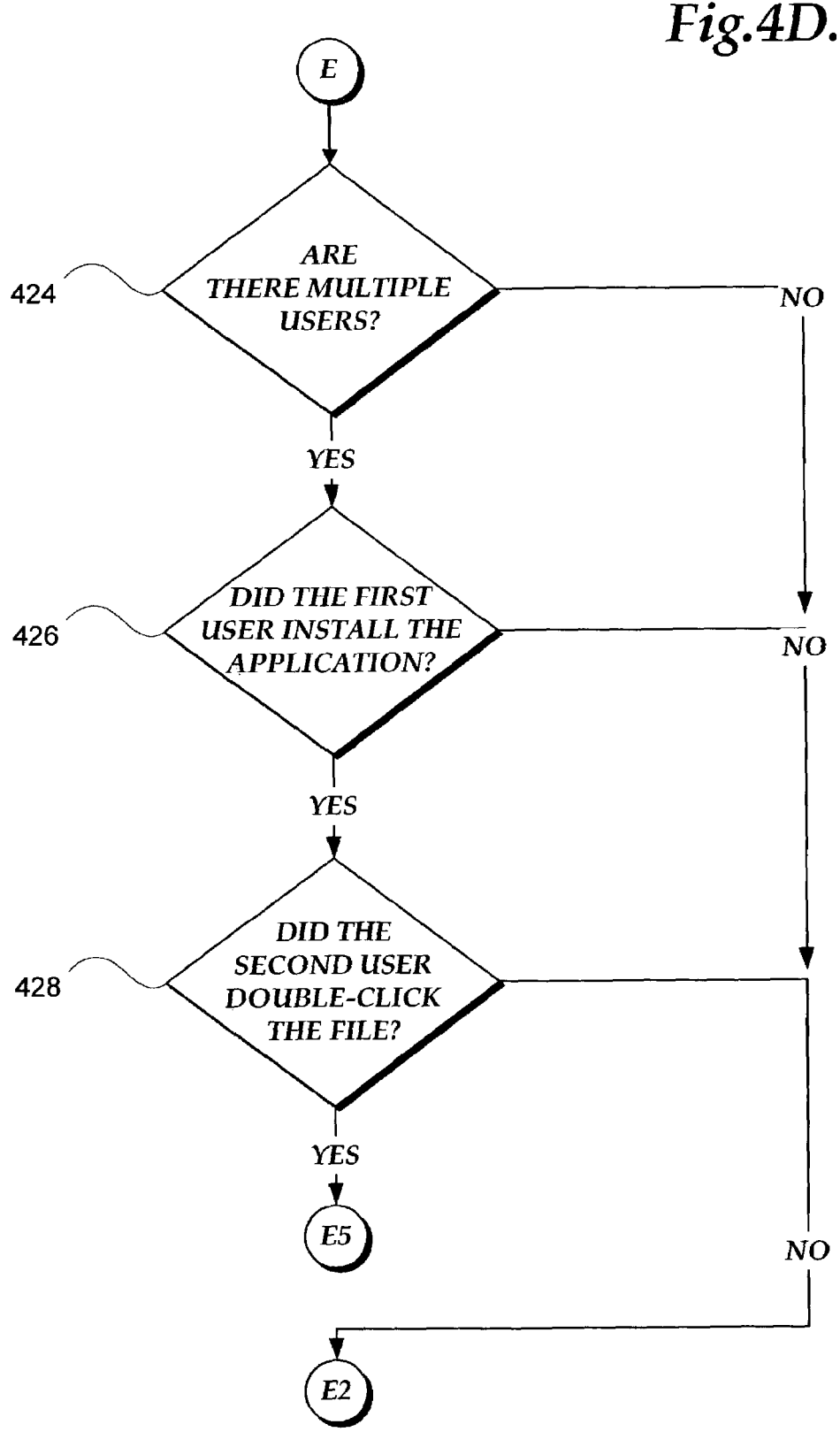
Figure 4E:
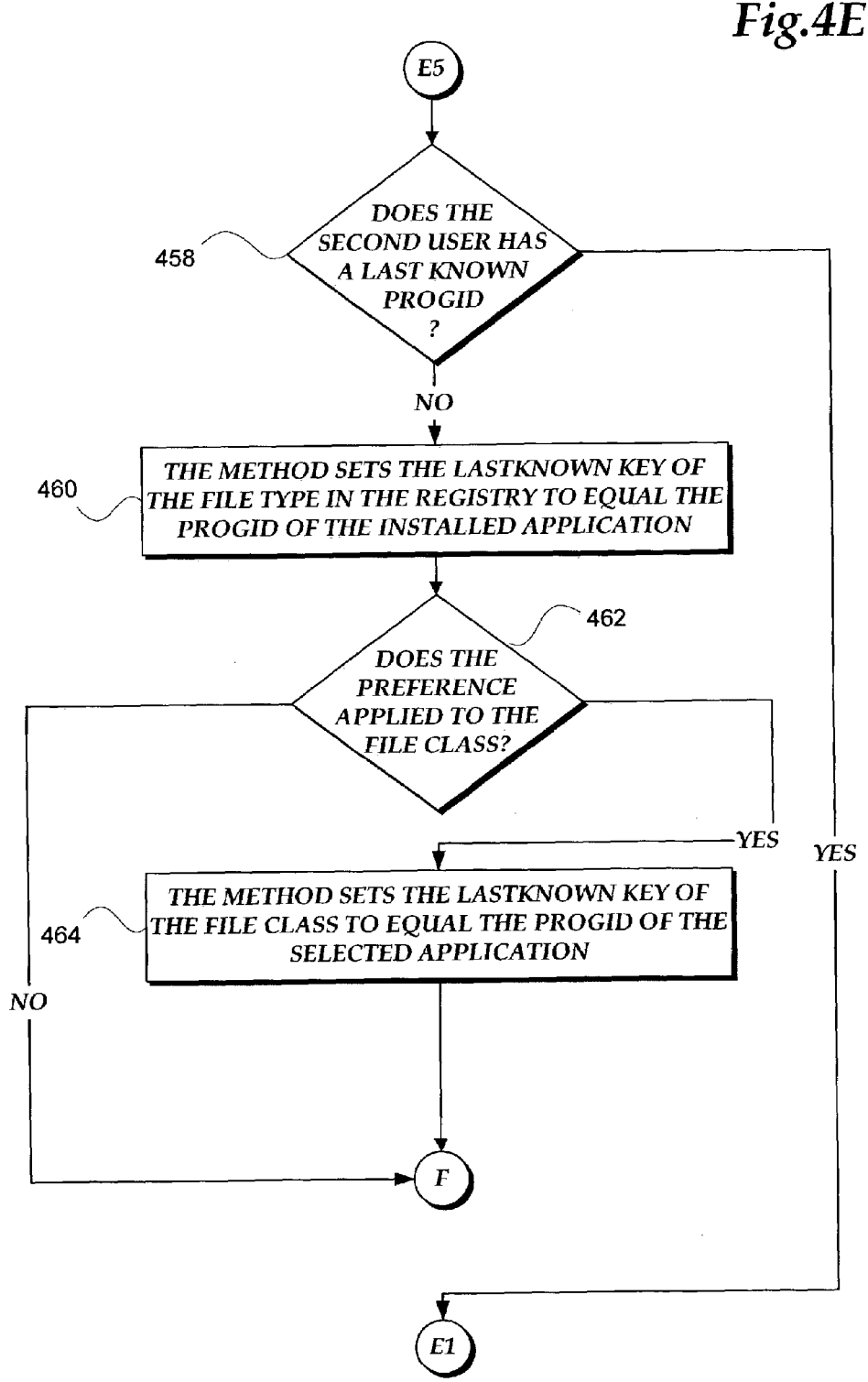
Figure 4F:
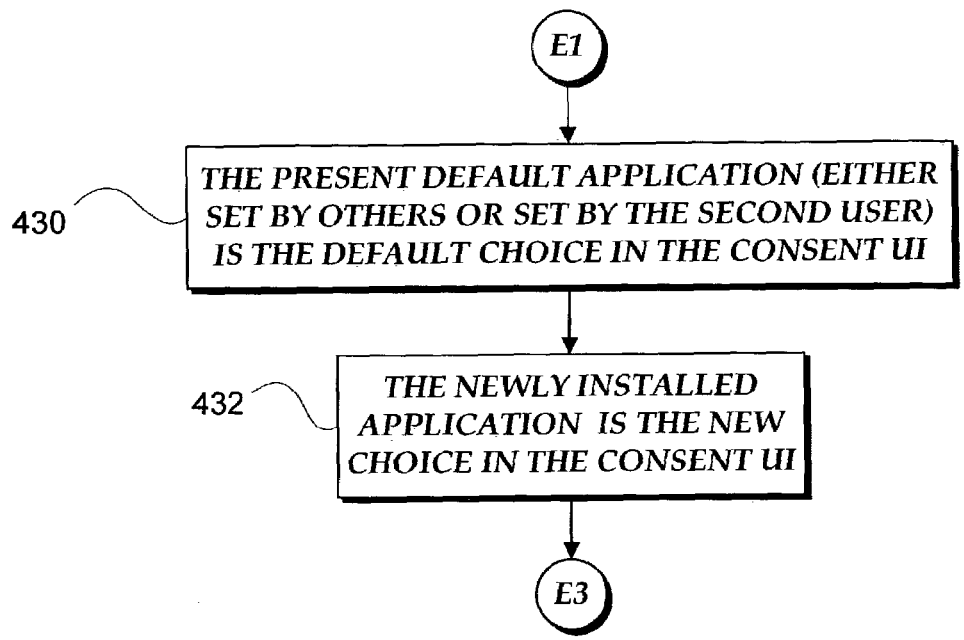
Figure 4F:
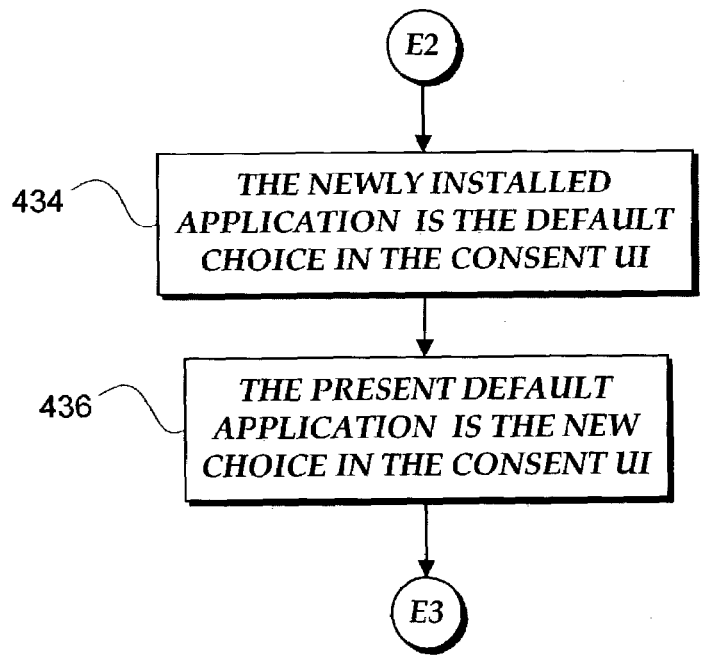
Figure 4G:
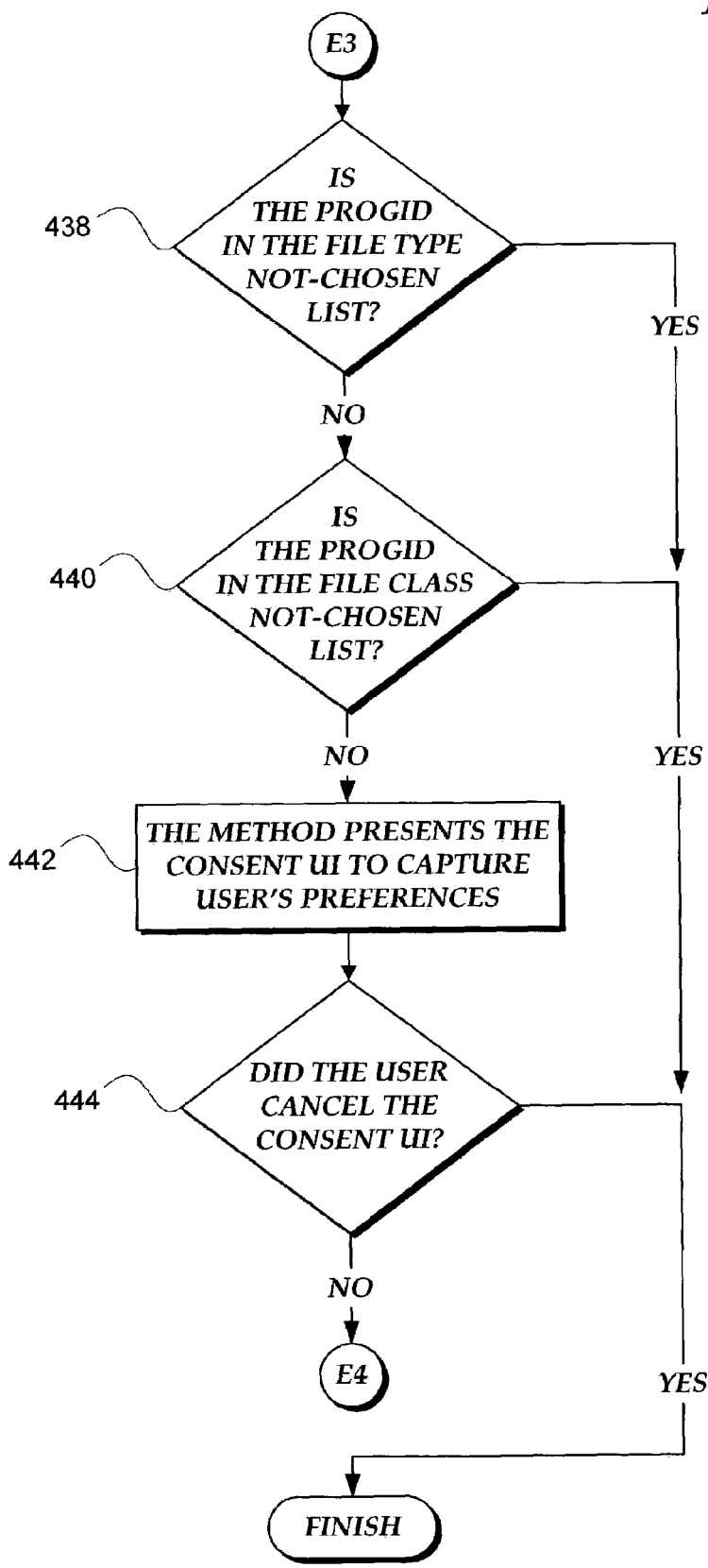
Figure 4H:
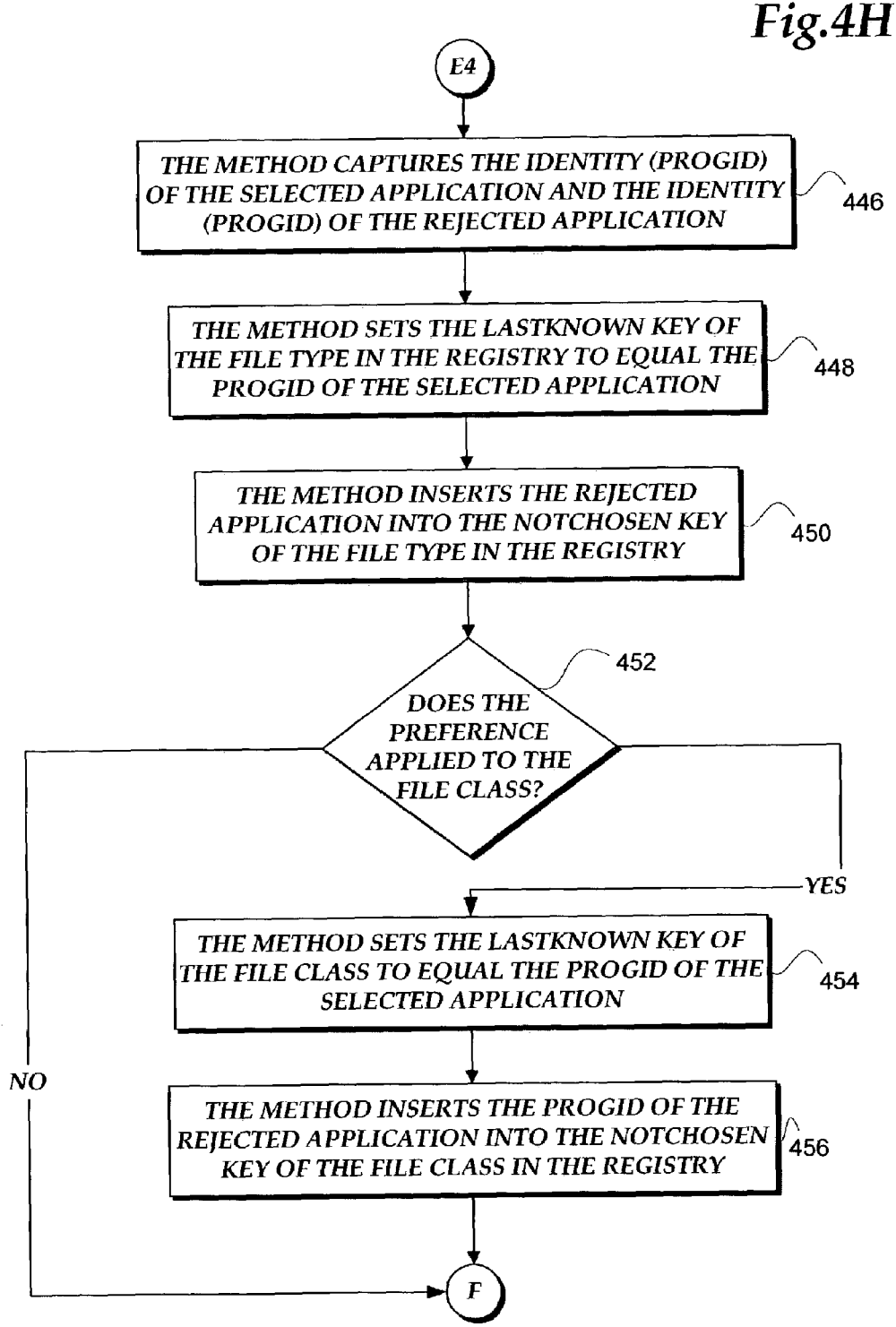

The consent user interface 332 is illustrated in FIG. 3B in greater detail. As discussed above, the consent user interface 332 is presented to the user whenever there is an ambiguity in the preference of the user, such as file association. The consent user interface 332, like other window applications, includes a title bar 334, which is a horizontal space at the top of a window that contains the name to identify the consent user interface 332. A square button appears to the right corner of the title bar 334 with an X marked on it to represent a Close button 336. The consent user interface 332 can be canceled or dismissed by clicking on the button 336. Two application icons 340A, 340B serve as visual mnemonics of applications 302, 312, respectively. Icons 340A, 340B are choices for the user to select indicating a preference for the default launching application for file 322, as well as other files that have the same file extension ".boo." The user selects one of the icons 340A, 340B to indicate a choice. As discussed above, the selected choice is stored by the system 300 in the portion 324B of the central hierarchical database 324. The rejected choice is also stored in the portion 324B. More specifically, the selected choice is placed in the "lastknown" key, such as the key 368 or the key 397. The rejected choice is inserted into the "notchosen" key, such as the key 370 or the key 395. See FIG. 3C.

Returning to FIG. 3B, the consent user interface 332 includes text elements 338A, 338B for textually describing the choice status of applications 302, 312, which are represented by icons 340A, 340B in the consent user interface 332. For example, the text element 338A signifies that the application associated with the icon 340A is presently the default. The text element 338B, on the other hand, indicates that the application associated with the icon 340B is a new application, which represents an alternative application for servicing files with the file extension ".boo." Text elements 342A, 342B textually describe the names of applications associated with icons 340A, 340B, respectively. For example, the text element 342A contains the string "player-1" to reflect the name of the application 302. The text element 342B contains the string "player-2" to reflect the name of the application 312. These text elements allow the user to visually apprehend the choice status of two contending applications 302, 312.

Besides clicking on one of the icons 340A, 340B to indicate a preference, the user can also actuate buttons 344A, 344B to indicate his choice. If the user declines to select either of the icons 340A, 340B, or either of the buttons 344A, 344B, no preference is provided by the user, and the default application (which in this case is the application 302) will be launched. The next time the user double-clicks on a file of file extension ".boo," the consent user interface 332 will again present the two choices for the user to select from.

Portions 324A, 324B, as previously discussed, are contained in the central hierarchical database 324. Portions 324A, 324B are preferably placed in the data structure 346, which is an organizational scheme, to facilitate interpretation of the choices made by the user or performing operations on these choices. See FIG. 3C. The data structure 346 includes the key 348 named "HKEY_CLASSES_ROOT." Various keys can be organized under the key 348 to design a file association, which enables the control of certain aspects of the operating system's treatment of different file types, such as file extension ".boo." These aspects include the default application that launches when a user double-clicks a file; the icon that appears for a file by default; and the appearance of the file for a file type when viewed in a window of a windowing operating system. The central hierarchical database 324 stores file extension keys, such as the key 350 ".boo," under the key 348 "HKEY_CLASSES_ROOT" in the data structure 346. File extension keys include the leading period when creating file type key entries in the data structure 346. See, for example, the key 350 in which the file extension "boo" is preceded with a period symbol ".".

Each file extension key in the data structure 346 has several minor keys and attributes. For example, the file extension key 350 is equated to a programmatic identifier "player-1.mediaplayer.1" at the key 352. The perceived type of the file extension key 350 is defined at a key 354. The perceived type of a file extension is essentially a superclass of the file extension. For example, the file extension ".boo" as defined at the key 350 groups a number of files together as a common type. The perceived type or the file class groups together a number of file extensions as a genus of species. In the data structure 346, the file extension ".boo" has a perceived type of video.

A key 356 "openwithprogids" under the key 350 contains a list of alternate programmatic identifiers for the file type ".boo." The list of alternate programmatic identifiers includes "player-1.mediaplayer.1" defined at a key 358 and a programmatic identifier "player-2.mediaplayer. 1" defined at a key 360. Another key under the key 350 is an "openwithlist" key 362. This key contains one or more application keys for applications to appear as items in a pop-up box when the user right-clicks a file icon. The list under the key 362 includes "player-1.mediaplayer.exe" defined at a key 364 and "player-2.mediaplayer.exe" defined at a key 366.

User preferences captured by the consent user interface 332 are stored at keys 368, 370. The key 368 is named "lastknown" to denote the last known preference of the user in regard to a default launching application associated with the file type defined by the key 350. In the data structure 346, the "lastknown" key 368 is set to the programmatic identifier "player-1.mediaplayer.1." The application that is not chosen by the user is also captured by the consent user interface 332. That information is placed at the key 370 named "notchosen." The information stored at the key 370 is a list of programmatic identifiers associated with applications that have been rejected by the user. This list is used to refrain from re-presenting the consent user interface 332 when one of the application choices has already been rejected and described in the list stored at the key 370.

Programmatic identifiers are defined under the "HKEY_CLASSES_ROOT" 348, such as keys 372, 375. Programmatic identifier keys are used to associate a file type (such as ".boo" defined at the key 350) with an application and to control the behavior of the association. The key 372 defines the programmatic identifier "player-1.mediaplayer.1," which is associated with the executable of the application 302 defined in the first string of the key 374. Thus, the programmatic identifier "player-1.mediaplayer.1" acts as the bridge between the file type ".boo" and the executable of the application 302. When a file of the file type ".boo" is double-clicked the executable of the application 302 will be invoked. The key 375 defines the programmatic identifier "player-2.mediaplayer.1," which associates the file type ".boo" (defined at the key 350) and the executable of the application 312 in the first string of the key 376.

As discussed above, a perceived type or a file class describes a general category or kind containing one or more file types. Digressing, FIG. 3D illustrates an exemplary structure 393 in a tree-like form showing the relationship among file classes. At the top of the tree is the node 391. Node 389 defines a text file class. Reference 389A indicates two file extensions (.txt, .asc), which are covered by the text file class 389. Other text file extensions are possible. The text file class 389 describes file types that have data consisting of characters representing words and symbols of human speech or characters coded according to the ASCII standard, which assigns numeric values to numbers, letters, and certain symbols. The video file class 387 describes those file types that have moving visual information. Reference 387A illustrates a number of file extensions (such as .asf, .asx, .avi, .ivf, .m1v, .mp2, .mp2v, .mpa, .mpe, .mpeg, .mpg, .mpe2, .qt, .rm, .wm, .wma, .wmv, .wmx, and .wvx), which are file types containing video information. This list is not exhaustive and others are possible. The video class 387 is also a broad category that contains both the audio file class defined at node 385 and the image file class defined at node 383. Reference 385A lists a number of file extensions associated with audio information (such as .aif .aifc, .aiff, .asx, .au, .cda, mid, midi, .mp3, .mpu, .ra, ram, rmi, .smf, .snd, .wav, and .wma). This list is not exhaustive and others are possible. Reference 383A shows a number of file extensions that describe image information (such as .bmp, .dib, .emf, .gif, .ico, .jpg, .jpeg, .jpe, .jfif, .png, .rle, .tif, .tiff, and .wmf). This list is not exhaustive and others are possible. New file extensions can be added by newly installed applications. These new file extensions can be registered with the central hierarchical database to extend a file class.

The proliferation of file extensions has become confusing for many users. File classes, a portion of which are illustrated by the structure 393, relieve the user from the burden of associating a file type with a particular application. For example, certain users prefer that the text file class 389 is associated with a default launching application to process files of type ".txt" as well as files of type ".asc". Various embodiments of the present invention capture the user's preferences in regard to the association of a file class and an application with the consent user interface 332.

In a situation where a user desires to have a default application to service a number of file extensions or a file class but not a particular file extension, the user can associate another default application with the particular file extension using various embodiments of the present invention. For example, suppose a user already has a default application to service image file extensions .jpg and .bmp. The user by using various embodiments of the present invention can set a different default application to handle tiff without contention even if there exists another default application to handle .jpg and .bmp. In other words, the consent user interface need not be presented in this instance because there is no contention.

Returning to FIG. 3C, the data structure 346 includes a "systemfileassociations" key 394. This key 394 allows the association between a file class and an application. For example, a key 396 commences the association of the video file class 387 with an application. A key 398 describes a verb phrase "shell/play/command," which signifies that an application will be launched when the user double-clicks on a file of the video class. The launching application is defined in the strings of a key 399. The first string of the key 399 "%programfiles%/vendor-1/player-1mediaplayer.exe" denotes a directory path to the executable of the launching application. The second string of the key 399 "%1" denotes the first argument to the launching application. The key "systemfileassociations" 394 includes two additional keys 397, 395. Similar to the key "lastknown" 368, the key 397 is also called "lastknown". The key "lastknown" 397 contains the programmatic identifier of the application that is to be launched when a file of the file type "video" defined at key 396 is double-clicked. Like the key "notchosen" 370, the key 395 is called "notchosen." The key "notchosen" 395 contains a list of rejected application choices made by the user and captured by the consent user interface 332.

FIGS. 4A-4H illustrate a method 400 for realizing a user's preferences regarding applications to be launched for corresponding file types or file classes. For clarity purposes, the following description of the method 400 makes references to various elements illustrated in connection with the system 300 (FIG. 3A), the consent user interface 332 (FIG. 3B), the data structure 346 (FIG. 3C), and the file classes of the structure 393 (FIG. 3D). From a start block, the method 400 proceeds to a set of method steps 402, defined between a continuation terminal ("terminal A") and an exit terminal ("terminal B"). The set of method steps 402 describes the determination of whether there is a potential conflict in launching an application, such as applications 302, 312 to service a file, such as the file 322, of a particular file type, such as ".boo."

From terminal A (FIG. 4B), the method 400 proceeds to a block 408 where the user double-clicks on the file 322 having the file type ".boo" serviceable by a number of installed applications, such as applications 302, 312. Next, the method 400 proceeds to decision block 410 where the system 300 determines whether there is a newly installed application, such as the application 312, that would also service the file type ".boo." If the answer is NO, the method 400 launches the default application, such as the application 302, to service the double-clicked file 322. See block 412. This is accomplished by looking at the data structure 346. The method 400 identifies the file type ".boo" at the key 350. The default application 302 is identified by the programmatic identifier "player-1.mediaplayer.1" at the key 352. Next, the method 400 looks up the programmatic identifier at the key 372 where the executable for the application 302 is described in the string contained in the key 374. See FIG. 3C. Returning to FIG. 4B, the method 400 terminates execution.

Otherwise, if the answer is YES to the test at decision block 410, another decision block 414 is entered by the method 400 where the system 300 determines whether there are multiple users. If the answer is NO, the method 400 proceeds to terminal B. Otherwise, the answer to the test at decision block 414 is YES, and the method 400 proceeds to another exit terminal ("terminal D").

From the exit terminal B (FIG. 4A), the method 400 proceeds to a set of method steps 404, defined between a continuation terminal ("terminal C") and the exit terminal D. The set of method steps 404 describes the determination of an application to be launched to service the file type ".boo."

From terminal C (FIG. 4C), the method 400 proceeds to decision block 416 where the system 300 determines whether the "lastknown" key 368 of the file type ".boo" of key 350 is set to a programmatic identifier ("progid"), such as the programmatic identifier "player-1.mediaplayer.1." If the answer is YES, the method 400 proceeds to the exit terminal D. If the answer is NO, another decision block 418 is entered by the method 400 where the system 300 determines whether the file class of the file type ".boo" has a last known programmatic identifier. The file class of the file type ".boo" is "video" as defined at the key 354. The key 397 indicates that the file class video has a last known programmatic identifier "player-1.mediaplayer.1" If the answer to the test at decision block 418 is YES, the method 400 proceeds to the exit terminal D.

Otherwise, the answer is NO, and block 420 is entered by the method 400. At this block, the method 400 sets the last known key 368 of the file type ".boo" to the programmatic identifier (e.g., player-2.mediaplayer.1) of the newly installed application, such as the application 312. The method 400 then launches the newly installed application 312 to service the double-clicked file 322. See block 422. Next, the method 400 terminates execution. The technical principles associated with the set of method steps 404 (and described in greater detail between steps 416-422) are that when the user installs an application, the user is asserting a choice. If this choice is in contention with an existing application in the system 300 and the user did not install the existing application, the new application should become the default application for either the file type or the file class without invoking the consent user interface 332. In other words, the installation of a new program can be viewed as the first decision the user has made. All previous decisions made on behalf of the user have less weight than those choices and decisions made by the user. If the same user installs a second application, such as the application 312, that is in contention with the first installed application, such as the application 302, the consent user interface 332 is invoked to resolve the ambiguity in the user's choices. The set of method steps 406 describe this in greater detail below.

From the exit terminal D (FIG. 4A), the method 400 proceeds to the set of method steps 406, defined between a continuation terminal ("terminal E") and an exit terminal ("terminal F"). As discussed above, the set of method steps 406 describes the presentation of the consent user interface 332 to capture the user's preferences in regard to a desired application to be launched to service files of a particular file type or file class.

From terminal E (FIG. 4D), the method 400 proceeds to another decision block 424 where the system 300 determines whether there are multiple users. If the answer is NO, the method 400 proceeds to another continuation terminal ("terminal E2"). If the answer is YES, decision block 426 is entered by the method 400. At this decision block, the system 300 determines whether the first user installed the new application 312. If the answer is NO, the method 400 proceeds to the terminal E2. Otherwise, the answer is YES to the test at decision block 426 and the method proceeds to another decision block 428. At decision block 428, the system 300 determines whether the second user double-clicks the file 322. If the answer is NO, the method 400 proceeds to the terminal E2. Otherwise, the answer is YES, and the method 400 proceeds to another continuation terminal ("terminal E5").

From terminal E5 (FIG. 4E), the method 400 proceeds to decision block 458 where the method determines whether the central hierarchical database associated with the second user has the lastknown key 368 set to a programmatic identifier. If the answer is YES, the method 400 proceeds to another continuation terminal ("terminal E1"). Otherwise, if the answer is NO, the method 400 sets the lastknown key 368 of the file type (associated with file double-clicked by the user) to equal the programmatic identifier of the newly installed application. See block 460. Next at decision block 462, a test is made to determine whether the preference associated with the newly installed application is to be applied to the file class. If the answer is YES, the method 400 sets the lastknown key 397 to the programmatic identifier of the newly installed application. The exit terminal F is then entered by the method 400. If the answer is NO to the test at decision block 462, the exit terminal F is also entered by the method 400.

From terminal E1 (FIG. 4F), the method 400 proceeds to block 430 where the present default application, which is either set by others or set by the second user, is the default choice in the consent user interface 332. The newly installed application is presented as the new choice in the consent user interface 332. See block 432. The technical principles at steps 430, 432 are to inform the user that there are new options available (created by the first user). In order to maintain the second user's computing experience, the default application remains the original default application in the consent user interface 332. In other words, the purpose is to inform the user that there are new application options available but not to let another user's preference to overwrite the preference of the second user.

From terminal E2 (FIG. 4F), the method 400 proceeds to block 434 where the newly installed application 312 is the default choice in the consent user interface 332. The present default application is the new choice in the consent user interface 332. See block 436. The technical principles governing the presentation of choices formed by steps 434, 436 are the assumption that the user prefers the newly installed application and the presentation of the consent user interface 332 is to confirm such a preference.

From terminal E3 (FIG. 4G), the method 400 proceeds to decision block 438 where the system 300 determines whether the programmatic identifier of the newly installed application 312 is in the notchosen list (at the key 370) of the file type ".boo." If the answer is YES, the method 400 terminates execution. If the answer is NO to the test at decision block 438, another decision block 440 is entered by the method 400. At this decision block the system 300 determines whether the programmatic identifier "player-2.mediaplayer.1" of the newly installed application 312 is in the notchosen list (defined at the key 395) of the file class video (defined at the class 396). If the answer is YES, the method 400 terminates execution. Otherwise, the answer is NO, and block 442 is entered by the method 400. The technical principles associated with steps 438, 440 are to solve the problem where the presentation of the consent user interface 332 becomes contentious. For example, background services 326, 328, instead of causing instability associated with the portion 324A of the central hierarchical database 324, may compel the presentation of the consent user interface 332. The user is then forced to continually pick a default application. This will test a user's patience. The method 400 keeps track of the applications that the user has rejected. These rejected choices are stored in the notchosen keys of the data structure 346, such as the key 370 and the key 395. While rejected applications are still available for the user to execute, these rejected applications are inhibited from harassing the user further.

At block 442 the method 400 presents the consent user interface 332 to capture the user's preferences. Next, the method 400 proceeds to another decision block 444 where the method 400 determines whether the user has canceled the consent user interface 332 prior to making a selection or a choice. If the answer is YES, the method 400 terminates execution. Otherwise, the answer is NO, and the method 400 proceeds to another continuation terminal ("terminal E4"). If the user cancels the consent user interface 332 without making a choice, these choices will be re-presented to the user via the consent user interface 332 the next time a file of the file type ".boo" is double-clicked.

From terminal E4 (FIG. 4H), the method 400 captures the programmatic identifier of the selected application and the programmatic identifier of the rejected application. See block 446. The method 400 sets the lastknown key 368 of the file type ".boo" in the data structure 346 to equal the programmatic identifier of the selected application. See block 448. Next, at block 450, the method 400 inserts the rejected application into the notchosen key 370 of the file type ".boo" of the data structure 346. See block 450.

The method 400 continues to decision block 452, where the method 400 determines whether the preference of the user is to be applied to the file class "video." If the answer is NO, the method 400 continues to the exit terminal F and terminates execution. Otherwise, if the answer is YES, the method 400 sets the lastknown key 397 of the file class "video" (defined at the key 396) in the data structure 346 to equal the programmatic identifier of the selected application. Next, the method 400 inserts the programmatic identifier of the rejected application into the notchosen key 395 of the file class video (defined at the key 396) in the data structure 346. See block 456. Then the method 400 proceeds to the exit terminal F and terminates execution.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for capturing a user's preferred applications, comprising:
   receiving a request from a background agent associated with an application to open a consent window that allows a user to select a preferred application for handling a file type;
   determining that the application has not been previously rejected by the user for selection as the preferred application for handling the file type by comparing a programmatic identifier associated with the application with a list of programmatic identifiers associated with applications that the user has previously rejected; and
   displaying the consent window occupying a portion of a screen of a display device, the consent window including:
   a first icon for representing the default application that is a previously preferred application for the consideration of the user to select as a preferred application to be launched to process the file type; and
   a second icon for representing the application for the consideration of the user to select as the preferred application to be launched to process the file type.

2. The method of claim 1, wherein the consent window includes a first text element for textually describing the identity of the first icon.

3. The method of claim 2, wherein the consent window includes a second text element for textually describing the identity of the second icon.

4. The method of claim 3, wherein the consent window includes a first button located within proximity of the first icon, the first button being receptive to a selection action to indicate that the default application is the preferred application.

5. The method of claim 4, wherein the consent window includes a second button located within proximity of the second icon, the second button being receptive to a selection action to indicate that the application is the preferred application.

6. A method in a computer system for capturing a user's preferences, comprising:
   presenting, at a computerized display device, a consent window to show applications that process a same kind of file, the consent window being presented if a contention exists between a first application and a second application to process the same kind of file and neither the first application nor the second application has been previously rejected by the user for processing the same kind of file or an individual file type classified within the same kind of file;
   receiving an indication from a user that the first application is selected; and storing the identity of the first application as a selected application for handing the same kind of file in a portion of a database and the identity of the second application as a rejected application in another portion of the database storing a list of applications rejected for processing the same kind of file, wherein the identity of the second application in the database prevents presentation of the second application in the consent window in the future for the purpose of selecting a default application to handle the same kind of file.

7. The method of claim 6, further comprising the act of receiving an indication that a new application for handling the same kind of file has been installed by a user in the computer system; and making the new application the default application for handling the same kind of file without redisplaying the consent window.

8. The method of claim 6, wherein the portion of the database includes a key for representing a file type, the key for representing the file type including a first key for storing the identity of the selected application, the identity of the selected application being in a human-readable language.

9. The method of claim 8, wherein the key for representing the file type includes a second key for storing identities of rejected applications, each rejected application inhibiting the execution of the act of presenting the consent window when the rejected application is a choice to be shown in the consent window.

10. The method of claim 9, wherein the portion of the database includes a key for representing a file class, each file class being representative of one or more file types, the key for representing the file class including a first key for storing the identity of the selected application and a second key for storing identities of rejected applications, the identities of the rejected applications being in a human-readable language.

11. A method implemented in a computer system for realizing a user's preferences for launching applications for corresponding kinds of files, the method comprising:
   receiving a request to launch a first application to service a file;
   determining a contention exists because a second application is available to service the same kind of file; and
   presenting a consent user interface to allow the user to indicate a preference between the first application and the second application upon determining the contention exists between the first application and the second application to process files of the same kind, the computer system disabling the consent user interface from being presented if one of the first or second applications has an identity belonging to a list of identities of applications previously rejected for servicing the same kind of file, wherein changes to the preference is prevented unless made via the consent user interface.

12. The method of claim 11, wherein said receiving results from the user selecting the file.

13. The method of claim 12, wherein the second application is a newly installed application, the method further comprising determining whether multiple users have accounts on the computer system.

14. The method of claim 13, wherein the computer system has only one account from the user, the method further comprising checking a last known key in a data structure to determine whether the last known key is empty, the last known key being indicative of a preferred application chosen by the user via the consent user interface.

15. The method of claim 14, wherein the last known key is empty, the method further comprising setting the last known key to a programmatic identifier of the second application and launching the second application to service the file.

16. The method of claim 14, wherein the last known key is not empty, the method further comprising defining the second application as a default choice in the consent user interface and the first application as a new choice in the consent user interface, the act of defining being executed prior to the act of presenting the consent user interface.

17. The method of claim 16, further comprising checking a notchosen key in the data structure to determine whether a programmatic identifier of the second application is contained in the notchosen key, the notchosen key being indicative of a number of rejected applications not chosen by the user via the consent user interface, the act of checking the notchosen key being executed prior to the act of presenting the consent user interface.

18. The method of claim 17, further comprising inhibiting changes to the contents of the notchosen key unless made via the consent user interface.

19. The method of claim 18, further comprising determining whether the user cancels the consent user interface without indicating the preference, and terminating the execution of the method if the user cancels the consent user interface without indicating the preference.

20. The method of claim 19, wherein the user indicates the preference, the method further comprising storing the identity of the preferred application into the lastknown key and inserting the identity of the rejected application into the notchosen key.

21. The method of claim 13, wherein the computer system has one account from the user and another account from a second user, the method further comprising determining whether the user installs the newly installed application and whether the second user selects the file.

22. The method of claim 21, wherein the user installs the newly installed application and the second user selects the file, the method further comprising defining the first application as a default choice in the consent user interface and the second application as a new choice in the consent user interface, the act of defining being executed prior to the act of presenting the consent user interface.

* * * * *